(12) United States Patent
Tomas et al.

(10) Patent No.: US 9,288,107 B2
(45) Date of Patent: Mar. 15, 2016

(54) METHOD AND SYSTEM FOR CONTROLLING OPERATIONS IN A MOBILE COMMUNICATION DEVICE THAT IS ENABLED FOR NEAR FIELD COMMUNICATION (NFC)

(71) Applicant: NXP B.V., Eindhoven (NL)

(72) Inventors: Daniel Tomas, Caen (FR); Xavier Kerdreux, Saint-contest (FR)

(73) Assignee: NXP B.V., Eindhoven (NL)

( * ) Notice: Subject to any disclaimer, the term of this patent is extended or adjusted under 35 U.S.C. 154(b) by 148 days.

(21) Appl. No.: 14/094,660

(22) Filed: Dec. 2, 2013

(65) Prior Publication Data

US 2014/0154979 A1    Jun. 5, 2014

(30) Foreign Application Priority Data

Dec. 3, 2012  (EP) .................................... 12290426

(51) Int. Cl.
*H04W 4/00*   (2009.01)
*H04L 12/24*  (2006.01)
*G06F 9/44*   (2006.01)
*H04L 29/08*  (2006.01)
*G06Q 20/32*  (2012.01)

(52) U.S. Cl.
CPC .......... *H04L 41/0806* (2013.01); *G06F 9/4403* (2013.01); *G06Q 20/3278* (2013.01); *H04L 67/146* (2013.01); *H04W 4/003* (2013.01); *H04W 4/008* (2013.01)

(58) Field of Classification Search
CPC .......................... G06Q 20/3278; H04W 4/008
See application file for complete search history.

(56) References Cited

U.S. PATENT DOCUMENTS

2008/0121687 A1   5/2008   Buhot
2011/0244797 A1  10/2011   Kulkarni et al.
2012/0129451 A1   5/2012   Metivier (Continued)

FOREIGN PATENT DOCUMENTS

WO    2010/067222 A2    6/2010

OTHER PUBLICATIONS

"Smart Cards: UICC—Contactless Front-End (CLF) Interface; Host Controller Interface (HCI) (Release 7)", ETSI TS 102 622 V7.0.0 Technical Specification, ETSI Standard, European Telecommunications Standards Institute, vol. SCP-T, No. V7.2.0, (Feb. 2008).
Extended European Search Report for Patent Appln. No. 12290426.1 (Jun. 13, 2013).
ETSI TS 102 613 V7.3.0 Technical Specification; Smart Cards; UICC-Contactless Front-end (CLF) interface; Part 1: Physical and data link layer characteristics (Release 7); Sep. 2008; p. 1-57.

(Continued)

*Primary Examiner* — David Bilodeau

(57) ABSTRACT

Embodiments of a method and system are disclosed. One embodiment is a method for controlling operations in a mobile communication device that is enabled for near field communication (NFC). The method involves starting an NFC service in the mobile communication device, starting an initialization process of a secure element (SE), e.g., a Universal Integrated Circuit Card (UICC), of the mobile communication device in response to starting the NFC service, and once the initialization process of the SE has begun, monitoring an SE-specific session ID for an indication of the status of the initialization process of the SE. If the SE-specific session ID indicates that the initialization process is not complete, the method involves continuing to monitor the SE-generated session ID and if the SE-specific session ID indicates that the initialization process is complete, the method involves notifying the NFC service that the initialization process of the SE is complete.

17 Claims, 5 Drawing Sheets

(56) References Cited

U.S. PATENT DOCUMENTS

| | | |
|---|---|---|
| 2012/0159163 A1 | 6/2012 | Von Behren et al. |
| 2012/0178366 A1 | 7/2012 | Levy et al. |
| 2012/0295588 A1 | 11/2012 | Chen et al. |
| 2013/0317927 A1* | 11/2013 | Bush et al. ............... 705/21 |
| 2014/0074637 A1* | 3/2014 | Hammad ................. 705/21 |
| 2014/0108263 A1* | 4/2014 | Ortiz et al. .............. 705/71 |

OTHER PUBLICATIONS

Nikitin, Pavel V. et al.; "An Overview of Near Field UHF RFID"; 2007; p. 1-8.

"NXP NFC controller PN544 for mobile phones and portable equipment"; Industry leading, 2nd generation NFC controller; Feb. 2010; p. 1-4.

* cited by examiner

METHOD AND SYSTEM FOR CONTROLLING OPERATIONS IN A MOBILE COMMUNICATION DEVICE THAT IS ENABLED FOR NEAR FIELD COMMUNICATION (NFC)

CROSS-REFERENCE TO RELATED APPLICATIONS

This application claims the priority under 35 U.S.C. §119 of European patent application no. 12290426.1, filed on Dec. 3, 2012, the contents of which are incorporated by reference herein.

Mobile communication devices, such as smartphones and pad/tablet computers are being equipped with near field communications (NFC) technology to support various NFC applications. NFC applications include, for example, mobile payment, mobile banking, mobile ticketing, and device-to-device sharing of content such as pictures, videos, and music.

In order to ensure smooth operation of NFC applications, NFC technology must be integrated into a mobile communication device in a manner that is compatible with other elements of the mobile communication device.

Embodiments of a method are disclosed. One embodiment is a method for controlling operations in a mobile communication device that is enabled for NFC. The method involves starting an NFC service in the mobile communication device, starting an initialization process of a secure element (SE) of the mobile communication device in response to starting the NFC service, and once the initialization process of the SE has begun, monitoring an SE-specific session ID for an indication of the status of the initialization process of the SE. If the SE-specific session ID indicates that the initialization process is not complete, the method involves continuing to monitor the SE-generated session ID and if the SE-specific session ID indicates that the initialization process is complete, the method involves notifying the NFC service that the initialization process of the SE is complete.

A mobile communication device that is enabled for NFC is also disclosed. In one embodiment, the mobile communication device includes an NFC service including a terminal host, an NFC controller including a host controller, and an SE including an SE host. The terminal host, the host controller, and the SE host communicate with each other via a Host Controller Interface (HCI) architecture. The mobile communication device includes a notification application that is configured to monitor an SE-specific session ID for an indication of the status of an initialization process of the SE and if the SE-specific session ID indicates that the initialization process of the SE is not complete, continue to monitor the SE-specific session ID, and if the SE-specific session ID indicates that the initialization process of the SE is complete, notify the terminal host that the initialization process of the SE is complete.

A mobile communication device that is enabled for NFC is also disclosed. In one embodiment, the mobile communication device includes an NFC service, an NFC controller, and an SE. The NFC service, the NFC controller, and the SE communicate with each other via a Host Controller Interface (HCI) architecture and start up of the NFC service triggers an initialization process of the SE. The mobile communication device also includes a notification application that is configured to monitor an SE-generated session ID for an indication of the status of an initialization process of the SE, and if the SE-generated session ID indicates that the initialization process of the SE is not complete, continue to monitor the SE-generated session ID, and if the SE-generated session ID indicates that the initialization process of the SE is complete, notify the NFC service that the initialization process of the SE is complete.

Other aspects in accordance with the invention will become apparent from the following detailed description, taken in conjunction with the accompanying drawings, illustrated by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
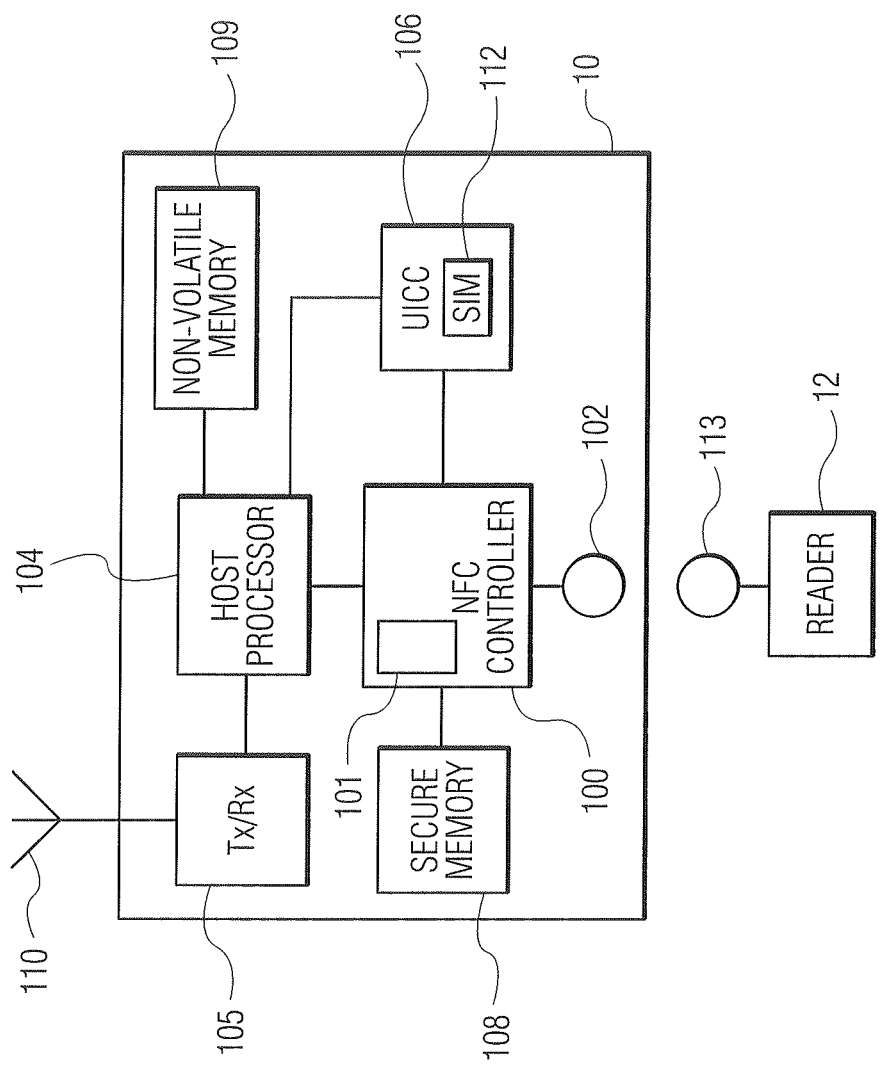
FIG. 1 depicts a communications environment that includes a mobile communication device and a reader, which communicate with each other via NFC.

FIG. 1 depicts a communications environment that includes a mobile communication device 10 and a reader 12, which communicate with each other via, for example, NFC. For example, the mobile communication device and the reader communicate via the NFC communications standard as defined by the International Organization for Standardization (ISO) and the International Electrotechnical Commission (IEC) 14443 standard. The mobile communication device 10 is configured to operate both as a terminal of a mobile telecommunications network (not shown), e.g., as a mobile telephone, and as a device in local bi-lateral NFC communication with the reader 12. In an embodiment, the mobile communication device is a wireless computing device such as a smartphone, a tablet computer, a pad computer, or a laptop computer.

An embodiment of the mobile communication device 10 is shown that includes a near field communication controller 100, an NFC antenna 102, a host processor 104, a mobile telecommunications transceiver 105, a Universal Integrated Circuit Card (UICC) 106, a secure memory 108, and a non-volatile memory 109. The NFC antenna 102 is coupled to the near field communication controller 100 and the near field communication controller has interfaces coupled to the host processor 104, the UICC 106, and the secure memory 108. The host processor 104 is a processor such as a central processing unit (CPU) that provides microinstruction and data processing capability for the mobile communication device. The host processor may include a multifunction processor and/or an application-specific processor. Examples of the host processor include the ATOM family of processors by INTEL, and the Ax family of processors from APPLE, and Advanced RISC Machine (ARM) based processors.

In the illustrated embodiment, the host processor 104 is functionally coupled to the non-volatile memory 109, to the UICC 106, and to the mobile telecommunications transceiver 105 as is known in the field of smartphones. In an embodiment, the host processor and the NFC controller communicate via UART, SPI, and/or I2C interfaces and the NFC controller and the UICC communicate via a Single Wire Protocol (SWP) interface. The near field communication controller 100 includes a further non-volatile memory 101, for example, flash memory, e.g., NAND flash or NOR flash, or EEPROM. The mobile telecommunications transceiver 105 is coupled to an antenna 110 for communication with a base station (not shown) that may communicate via known wireless protocols such as, without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), IEEE 802.16 standards bodies, and WiFi. Although some wireless communications protocols are identified herein, it should be understood that present disclosure is not limited to the cited wireless communications protocols. The UICC enables access to a wireless communications network of a wireless service provider, for example, a wireless communications network operated by a single wireless service provider, such as, for example, AT&T, VERIZON, T-MOBILE, SPRINT, VODAPHONE, ORANGE.

As is known in the field of NFC, a secure element is a module that includes embedded security functionality. For example, a secure element (sometime referred to as an "SE") includes embedded technologies, including hardware, software, and/or firmware, that protect assets such as data, security keys, and applications, form physical and/or software attacks. A secure element may include a smart card, an application processor, an SD card, a USB token, secure memory devices (e.g., flash or EEPROM), and UICCs. In an embodiment, a secure element includes a crypto-engine that is able to implement a cryptographic algorithm, such as an Advanced Encryption Standard (AES) algorithm. In an embodiment, the secure element is "secure" in the sense that the secure element is a highly tamper resistant device that provides a secure execution environment isolated from the host processor. In an embodiment, the secure element is tamper resistant in that the element can resist software and hardware attacks, either remotely or locally, e.g., the secure element is resistant against side channel analysis. In an embodiment, a secure element is a stand-alone IC device and in other embodiments the secure element is integrated on an IC with other functional elements or the secure element is a stand-alone IC packaged together is another IC, such as the near field communication controller 100.

In an embodiment, the UICC 106 includes a subscriber identity/identification module (SIM) 112 that stores subscriber identity information that is used to identify and authenticate the subscriber that uses the wireless service provider network. In an embodiment, the UICC is a secure element as is known in the field of NFC. The integrated use of NFC and a UICC is defined by the European Telecommunications Standards Institute (ETSI). For example, ETSI has published the standards:

ETSI TS 102 622, Smart Cards; UICC—Contactless Front-end (CLF) interface; Host Controller Interface (HCI); and ETSI TS 102 613, Smart Cards; UICC—Contactless Front-end (CLF) Interface; Part 1: Physical and data link layer characteristics.

With reference to FIG. 1, the secure memory 108 is a secure element. In an embodiment, the secure memory is a stand-alone IC device that includes flash and/or EEPROM memory although in other embodiments, the secure memory is packaged together with the near field communication controller 100. In the embodiment of FIG. 1, the secure memory communicates with the near field communication controller 100 via the SWP and HCI. In other embodiments, other communications protocols may be used. In an embodiment, the ETSI framework and the application management framework of the "GlobalPlatform" are integrated into the secure memory.

The reader 12 includes a coil 13 to generate a local RF electromagnetic field to interrogate a device in its near field. This may be used in a smart card reader, for example, where the mobile communication device 10 acts as a smart card. In another embodiment, the reader 12 is part of another device, such as another smartphone with an NFC interface, a peripheral connected to a payment system, or a peripheral of a computer.

In an embodiment, the near field communication controller 100 of the mobile communication device 10 is configured for use in a battery-less operation mode of the device, e.g., operation wherein the near field controller receives at least part of its power supply from an electromagnetic field provided by the reader 12 instead of from a battery of the mobile communication device. Interrogation by the reader 12 may be used to exchange messages with the near field communication controller 100. Such messages may be used, for example, in access control, with the mobile communication device 10 acting as an electronic key, or to perform electronic payments, with the mobile communication device 10 acting like a debit card, or to share information. The near field communication controller 100 may execute a transaction involving communication with the reader 12, which may include exchanging messages using the NFC antenna 102, for example, to read and/or write data from/to the secure memory 108. In an embodiment, the NFC controller includes a CPU, ROM, RAM, EEPROM, and I/O interfaces. An example of the NFC controller is the NFC controller, PN544 or PN547, by NXP SEMICONDUCTORS.

In an operation, only part of the mobile communication device 10 needs to be active to successfully communicate with the reader 12 and full mobile telephone functionality may not be needed for this communication. Thus, for example, only the near field communication controller 100 may be active, with the host processor 104, UICC 106, and the secure memory 108 receiving no power supply, or only selected ones of the host processor 104, the UICC 106, and the secure memory 108 may be active.

The near field communication controller 100 may also be configured to act as a reader itself, or both to act as a reader and as a device read by a reader. When the near field communication controller 100 is configured to act as reader, the reader 12 may be replaced by another device that responds to the near field communication controller 100.

The near field communication controller 100 may be implemented as a single integrated circuit. As used herein, the term near field communication controller 100 refers at least to that part of the mobile communication device 10 that must be active to exchange signals with the reader 12 or a device being read and to convert the signals into digital data that can be handled by the other circuits. In an embodiment, the near field communication controller 100 consists of all circuits that are able to function when power is supplied in a power supply domain that is activated by the reader 12. In practical terms, the near field communication controller 100 may be a single integrated circuit that is able to operate in this way.

The host processor 104 may be used as a privileged controller of the near field communication controller 100, activated, for example, in modes where power is made available to more than just the near field communication controller 100. As a privileged controller, the host processor 104 causes the near field communication controller 100 to set enablement information in its non-volatile memory 101 to enable or disable operations to be performed, wherein the host processor 104 is not directly involved. This may be the case when the near field communication controller 100 interacts with the reader 12, or when the controller is controlled by another host processor, such as a host processor in the UICC 106 or the secure memory 108. The host processor 104 may also be used to control selected operations of the near field communication controller 100.

Communication between a host processor such as the host processor 104 and the near field communication controller 100 involves use of various configuration parameters according to, for example, the Host Controller Interface (HCI) architecture as defined by ETSI or the NFC Controller Interface (NCI) specification as defined by the NFC Forum. Using the HCI architecture, communication with the near field communication controller 100 is modeled to proceed via one or more communication pipes, distinguished from each other by handles, which are data items that identify respective pipes. For each pipe, configuration information may be provided, such as identifications of protocols to be used, pointers to buffers etc. When using a pipe, the host processor 104 and the near field communication controller 100 use the handles to identify the pipes to each other. Information defining the handles and optional other configuration data is stored in the non-volatile memory 101 of the near field communication controller and in the non-volatile memory 109 that is directly accessible to the host processor. In an embodiment and according to the HCI architecture, a communications configuration of the host processor is identified via a session identifier (ID), referred to a SESSION_IDENTITY.

In order to minimize power consumption, the mobile communication device 10 is capable of operating in modes of operation wherein part or all of its components do not receive battery power. In a normal operating mode, at least the near field communication controller 100, the host processor 104, and the UICC 106 receive supply power from a battery (not shown) of the mobile communication device 10. In this mode, the mobile communication device 10 may communicate with a base station (not shown) of a wireless service provider network. In various power down modes, power supply to all or part of the near field communication controller 100, the host processor 104, and the subscriber identification module 106 may be cut off. The mobile communication device may switch to such a mode under control of a host processor, such as the host processor 104, when the host processor determines that a criterion for power saving is satisfied, but the switch may also be forced by battery condition or even complete removal of a battery.

Figure 2:
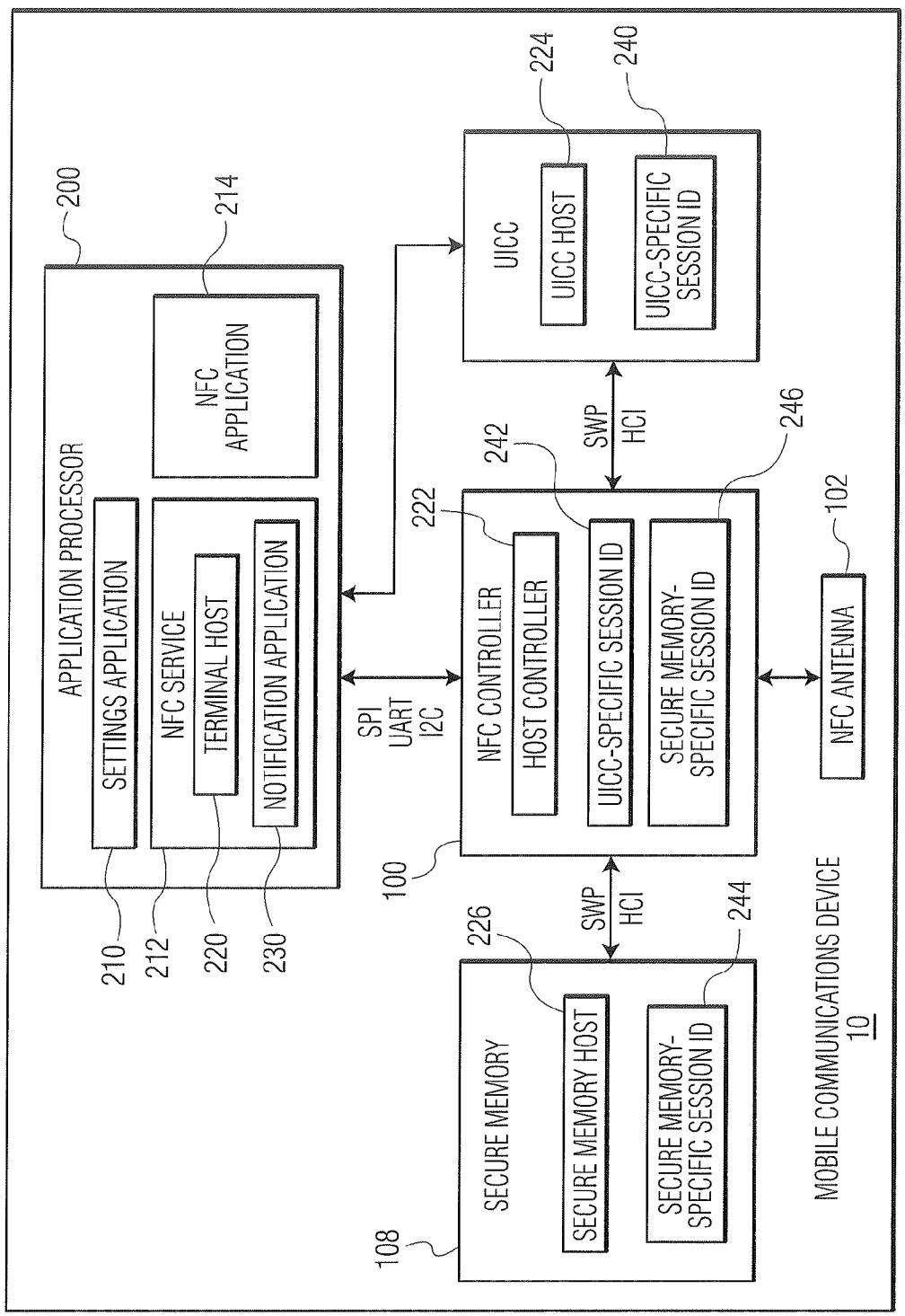
FIG. 2 depicts a functional block diagram of the mobile communication device of FIG. 1, which illustrates certain NFC elements of the device.

FIG. 2 depicts a functional block diagram of the mobile communication device 10 of FIG. 1, which illustrates certain NFC elements of the device. At the highest level of FIG. 2, the NFC enabled device includes an application processor 200, NFC controller 100, UICC 106, secure memory 108, and NFC antenna 102. Certain elements of FIG. 2 correspond directly to elements of FIG. 1 and such elements are identified with the same reference numbers. However, FIG. 2 is provided to represent certain elements at a higher functional level than that of FIG. 1. In particular, the application processor is a functional element that is implemented through the host processor 104 and the non-volatile memory 109 of FIG. 1. For example, the application processor utilizes the host processor to execute computer readable instructions that are stored in the non-volatile memory. Execution of the computer readable instructions implements, for example, a settings application 210, an NFC service 212, and at least one NFC application 214, all of which are shown in FIG. 2.

In an embodiment, the settings application 210 functions to control various settings of the mobile communication device such as Wi-Fi on/off, 3G/4G on/off, roaming on/off, NFC on/off, notifications, location services, user interface controls, keyboard settings, mail settings, contacts settings, and calendar settings, etc. As is described below, the settings application may be used to initiate the NFC service 212.

The NFC service 212 supports NFC functionality in the mobile communications device 10 and the NFC application 214 is an NFC enabled application such as mobile payment, mobile banking, mobile ticketing, or device-to-device sharing of content such as pictures, videos, and music. In an embodiment, the NFC service is a software module that controls the interface between the NFC application, the NFC controller 100, and the UICC 106, and the NFC application is a software module that interfaces with the NFC service and provides a user interface for a user of the mobile communication device.

The NFC controller 100, the UICC 106, secure memory 108, and the NFC antenna 102 are similar to or the same as the corresponding elements of FIG. 1. The NFC controller, typically a separate IC device, is a device that provides an interface between the NFC antenna, the UICC, the secure memory 108, and the host processor 104/application processor 200.

Functions of the NFC controller include, RF communications processing, antenna matching, power management, and host configuration management functions, such as storing different host configurations and notifying hosts when an NFC device is detected.

In an embodiment, the UICC 106 is a smart card that conforms to the specifications written and maintained by the ETSI Smart Card Platform project. In other embodiments, the UICC may be another form of smart. As described above, the UICC includes a SIM 112 that stores subscriber identity information that is used to identify and authenticate the subscriber that uses the wireless service provider network. In an embodiment, the UICC includes a CPU, ROM, RAM, EEPROM, and I/O interfaces. The UICC may be, for example, a full-size (85 mm×54 mm, ISO/IEC 7810 ID-1) smart card or a 25 mm×15 mm (ISO/IEC 7810 ID-000) smart card. In an embodiment, the UICC may be packaged together with the near field communication controller 100. In an embodiment, the ETSI framework and the application management framework of the "GlobalPlatform" are integrated into the UICC.

The NFC antenna 102 is an antenna that is compatible with communications in the near field. It is known in the field of RFID systems that the space around an antenna can be divided into two regions, referred to as the "near field" and the "far field." In the far field, field components decay as 1/r and in the near field, field components decay as $1/r^3$, where r is the distance from the antenna. An explanation of the far field and the near field is found in the document, "*An Overview of Near Field UHF RFID*," Pavel V. Nikitin et al., Feb. 2, 2007, which is incorporated by reference herein.

The HCI specification defines an NFC architecture that includes hosts, referred to as a terminal host, a host controller, and a UICC host, for use in a system such as that depicted in FIGS. 1 and 2. With regard to the mobile communication device of FIG. 2, the NFC service 210 includes a terminal host 220, the NFC controller 100 includes a host controller 222, and the UICC 106 includes a UICC host 224 as defined in the HCI specification. The secure memory also includes a secure memory host 226 that conforms to the HCI specification. The HCI specification also defines a communications protocol between the host elements, which includes a session initialization process that is implemented between a host (e.g., the terminal host or the UICC host) and the host controller to establish communications between the hosts, see HCI specification Section 8.4. A separate session initialization process is required to be performed between the terminal host 220 and the host controller 222 and between the UICC host 224 and the host controller 222. A specific technique for establishing communications between the terminal host 220 and the host controller 222 is described by Kulkarni et al. (U.S. Pat. Pub. No. 2011/0244797 A1), entitled "Portable communication device and a method of controlling near field communication." While Kulkarni et al. addresses the establishment of communications between the terminal host and the host controller, the current disclosure relates to ensuring that the UICC host has been completely initialized before certain NFC operations are performed. A conventional technique for initializing a session between a host controller and a UICC host is described with reference to FIG. 3, and a technique for controlling operations in a mobile communication device in accordance with the invention is described with reference to FIGS. 4 and 5.

Figure 3:
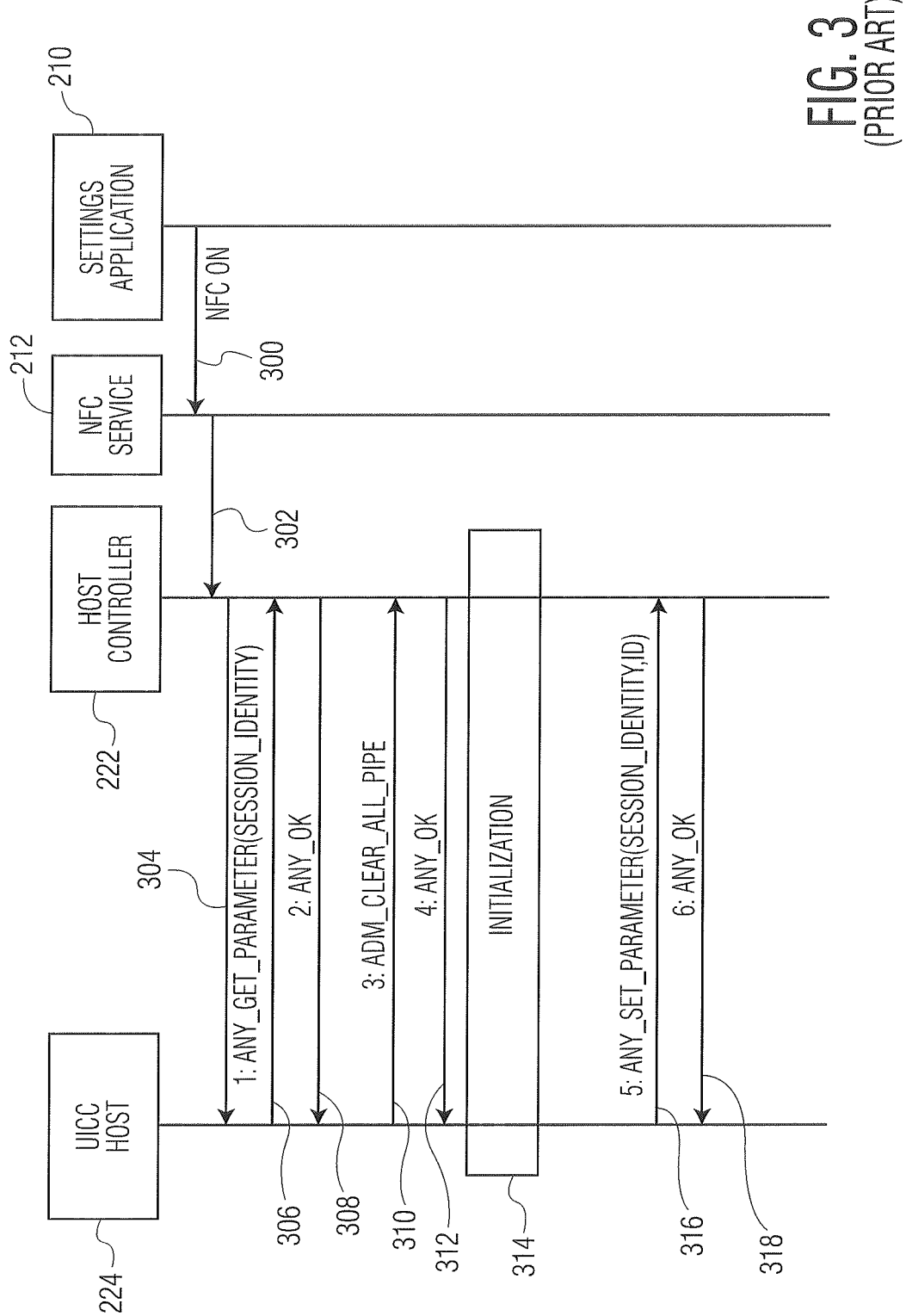
FIG. 3 depicts a message flow related to initializing a session between the host controller and the UICC of FIG. 2.

FIG. 3 depicts a message flow related to initializing a session between the host controller 222 and the UICC host 224 that follows the HCI specification, see HCI specification Section 8.4. In a first operation, the settings application 210 issues a command to start up the NFC service, e.g., an "NFC ON" message, 300. In response to the NFC ON message, the NFC service issues an "ON" message to the host controller, message 302, and the host controller issues and "ON" message to the UICC host, message 304. As described in the ETSI specification (Section 8.4), the UICC host queries the host controller for a UICC-specific session identifier (ID) (SESSION_IDENTITY) 242 that is stored at the host controller, message "ANY_GET_PARAMETER(SESSION_IDENTITY)," 306. According to the HCI specification, the session ID is an 8-byte value that is used to detect if the connected host configuration has changed. The value of the UICC-specific session ID that is stored at the host controller is returned with the "ANY_OK" message, 308. If the returned value of the UICC-specific session ID equals the previous value stored in the UICC host, then the initialization process stops. Otherwise, the UICC host needs to reinitialize itself. To reinitialize itself, the UICC host first requests the host controller to clear all pipes, "ADM_CLEAR_ALL_PIPE," 310. This operation causes the host controller to reset the UICC-specific session ID 242 that is stored locally at the host controller. For example, the UICC-specific session ID is reset at the host controller to a default value of "0xFF 0xFF 0xFF 0xFF 0xFF 0xFF 0xFF 0xFF." The "ANY_OK" message, 312, confirms that the pipes are all cleared and that the UICC-specific session ID is reset. After confirmation is received, the communications channel between the UICC host and the host controller is initialized as indicated by message block 314. In an embodiment, this initialization operation involves the creation of pipes between gates of the UICC host, the terminal host, and the host controller.

Once the initialization of the UICC 106 is complete, the UICC host 224 generates a new UICC-specific session ID 240 and stores the new session ID locally. The UICC host also updates the respective registry in the host controller via the message "ANY_SET_PARAMETER(SESSION_IDENTITY,ID)," 316. The host controller then confirms that the session ID has been updated in the host controller with the message "ANY_OK," 318.

Although completion of the session initialization process is confirmed between the UICC host 224 and the host controller 222 by the message "ANY_OK," message 318, there is no further confirmation communication to the NFC service 212. Therefore, the NFC service does not know if or when the UICC 106 has been successfully initialized. It has been found that NFC functionality can be compromised if certain commands/interrupts are sent to the UICC before initialization of the UICC is complete. Although the NFC service does not know if the UICC has been successfully initiated, the NFC service may begin to generate messages that have an impact on the UICC. For example, the NFC service may generate commands/interrupts that are sent to the UICC. If such commands/interrupts are received at the UICC before the UICC initialization is complete, NFC operations of the mobile communication device may be disrupted or may fail completely. Currently, there does not appear to be a mechanism to ensure that the initialization of the UICC has been completed before the UICC is subjected to commands/interrupts that could disrupt or disable the NFC functionality.

As described above with reference to FIG. 3, upon completion of the session initialization between the UICC host 224 and the host controller 222, the UICC host provides a UICC-specific session ID 240, which is stored at the UICC to the host controller, message "ANY_SET_PARAMETER(SESSION_IDENTITY,ID)," 316. In an embodiment, in accordance with the invention, the UICC-specific session ID is used as an indication that the initialization of the UICC is complete. In particular, the UICC-specific session ID 242, which is stored at the host controller, is monitored to determine if the initialization of the UICC is complete. In an embodiment, the UICC-specific session ID is the value of the "SESSION_IDENTITY" that is specific to the configuration of the UICC. The UICC-specific session ID is different from a session ID that is specific to the configuration of the terminal host 220. Once it has been determined from the UICC-specific session ID that the UICC initialization is complete, the terminal host of the NFC service 212 is notified of the completion. During the time that the UICC-specific session ID is monitored and until the notification is received, the terminal host of the NFC service suspends the sending of commands/interrupts to the UICC to prevent the disruption or failure of NFC functionality.

Therefore, by monitoring the UICC-specific session ID to determine the status of the UICC initialization process and notifying the terminal host when the UICC initialization process is complete, certain commands/interrupts can be held by the terminal host until the UICC is fully ready to receive and process such commands/interrupts.

Figure 4:
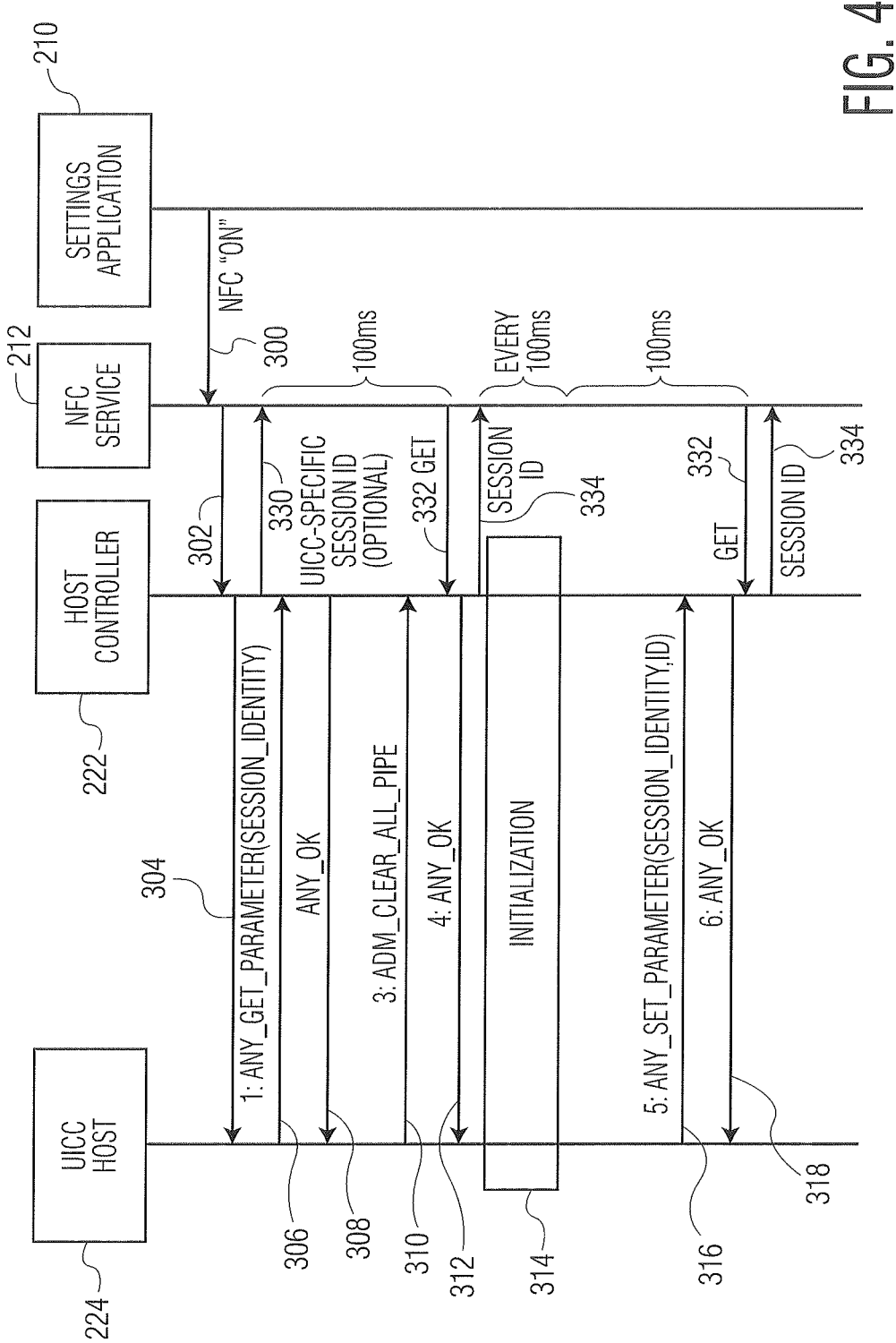
FIG. 4 depicts a message flow for controlling operations in the mobile communication device of FIG. 2 in which a UICC-specific session ID is monitored to determine if the UICC has been initialized.

FIG. 4 depicts a message flow in accordance with the invention in which the UICC-specific session ID is monitored to determine if the initialization of the UICC 106 is complete. The message flow of FIG. 4 is similar to the message flow of FIG. 3, with the message flow of FIG. 4 including a UICC-specific session ID monitoring routine and a notification function.

With reference to FIG. 4, in a first operation, the settings application issues a command to start up the NFC service, e.g., an "NFC ON" message, 300. In response to the NFC ON message, the NFC service issues an "ON" message to the host controller, message 302 and the host controller issues and "ON" message to the UICC host, message 304. Next, the UICC host queries the host controller for a UICC-specific session identifier (ID) (SESSION_IDENTITY) that is stored at the host controller, message "ANY_GET_PARAMETER (SESSION_IDENTITY)," 306. Additionally, the host controller returns the UICC-specific session ID, which is stored at the host controller, to the NFC service, message 330. From here, the UICC begins a session initialization process similar to that described above with reference to FIG. 3. For example, the UICC host 224 and the host controller 222 exchange messages 306-318 as described above with reference to FIG. 3.

However, while the UICC is going through the initialization process, the NFC service 212 monitors the UICC-specific session ID that is stored at the host controller 222.

As illustrated in FIG. 4, the NFC service makes periodic requests (e.g., GET requests, messages 332) for the UICC-specific session ID, e.g., every 100 ms, and the UICC-specific session ID stored at the host controller is returned, message 334. The returned UICC-specific session ID is then evaluated to determine the status of the UICC initialization process. In one embodiment, the returned UICC-specific session ID is evaluated against the default session ID of "0xFF 0xFF 0xFF 0xFF 0xFF 0xFF 0xFF 0xFF." If the returned UICC-specific session ID matches the default value, then it is determined that the UICC has not completed its initialization process. That is, because the UICC-specific session ID is reset to the default value if the UICC-specific session ID stored at the host controller does not match the session ID at the UICC, a returned default value can be taken as an indication that the UICC has not been initialized or that the UICC is undergoing an initialization process that is not yet complete. As long as the returned UICC-specific session ID continues to match the default value, the monitoring of the session ID continues.

In another embodiment, evaluating the returned UICC-specific session ID involves comparing the session ID that was returned to the NFC service 212 in the initial operation (via message 330) with a session ID that is returned during the monitoring (messages 334). If the two session IDs match, then it can be determined that the configuration of the UICC did not change and the UICC is initialized.

Once the UICC-specific session ID indicates that the UICC initialization process is complete, a notification is sent to the terminal host 220 of the NFC service 212. The notification indicates to the terminal host that it is now ok to send commands/interrupts to the UICC. For example, the terminal host may release commands/interrupts that were suspended by the terminal host while the session ID monitoring was ongoing.

Figure 5:
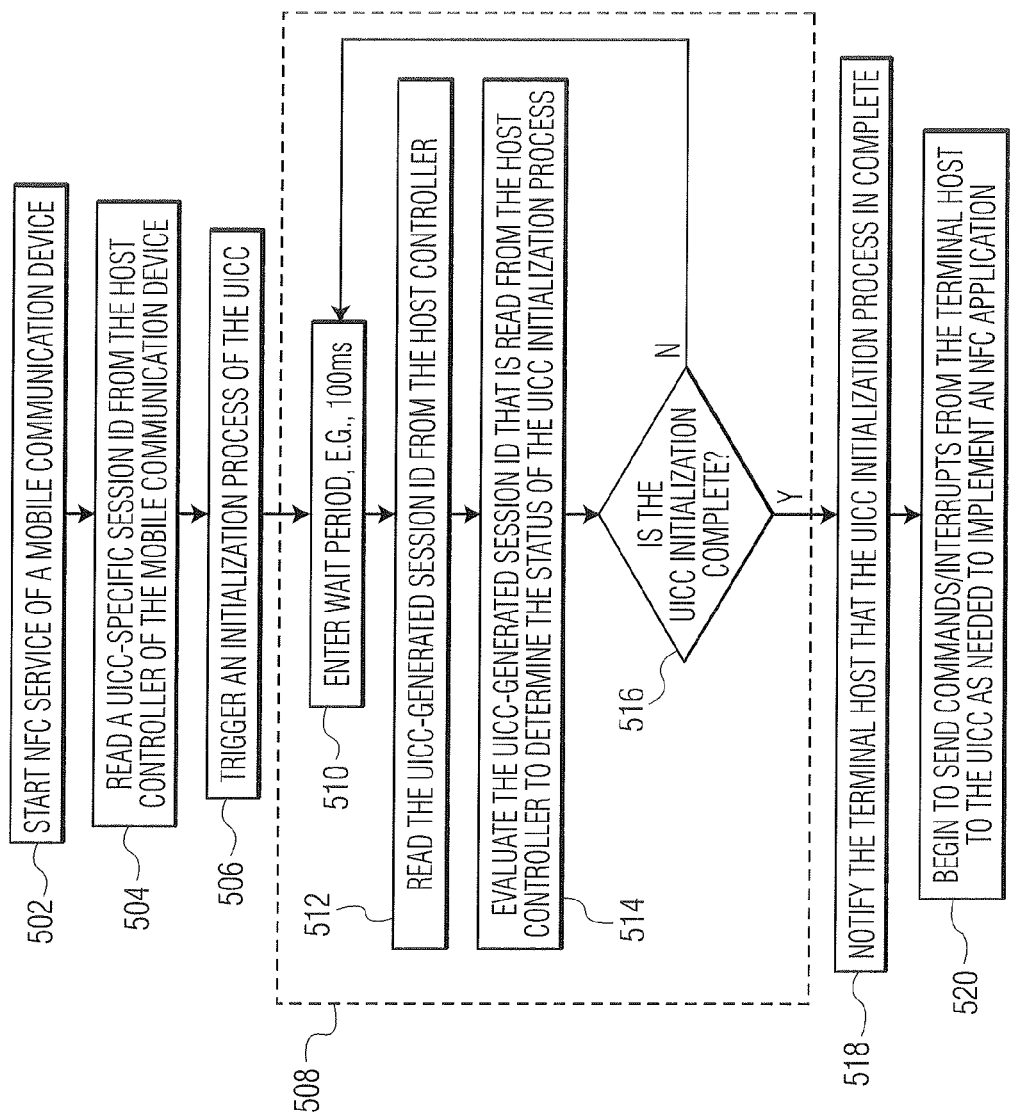
FIG. 5 is a process flow diagram of a method for controlling operations in a mobile communications device that is enabled for NFC communications.

FIG. 5 is a process flow diagram of a method for controlling operations in a mobile communications device that is enabled for NFC communications. At block 502, an NFC service of the mobile communication device is started. For example, a user of the mobile communication device enters the settings application and provides an input to start the NFC service. At block 504, a UICC-specific session ID is read from the host controller of the mobile communication device. At block 506, an initialization process of the UICC is triggered. For example, the initialization process is triggered in response to the start up of the NFC service. After block 506, the NFC service goes in to a monitoring mode (indicated by dashed box 508) that begins with a wait period, block 510, during which the NFC service does not send commands/interrupts to the UICC. In an embodiment, the wait period is 100 ms although other wait periods are possible. At block 512, upon expiration of the wait period, the UICC-generated session ID is read from the host controller. For example, the notification application of the NFC service reads the UICC-generated session ID from a registry of the host controller. At block 514, the UICC-generated session ID that is read from the host controller is evaluated to determine the status of the UICC initialization process. In an embodiment, if the read UICC-generated session ID matches the default value, then the initialization process in not complete. For example, the initialization process is not complete until the read UICC-generated session ID changes from the default value to a new value.

At decision point 516, it is determined whether or not the UICC initialization is complete. If it is determined that the initialization process is not complete, then the process returns to block 510 and after the wait period, the UICC-generated session ID is again read from the host controller and evaluated. The monitoring process 508 continues in a loop until the UICC-generated session ID indicates that the UICC initialization is complete. If is determined that the initialization process is complete, then at block 518 the terminal host is notified that the UICC initialization process in complete. Once the terminal host has been notified that the UICC initialization process is complete, at block 520, the terminal host can begin to send commands/interrupts to the UICC as needed to implement an NFC application.

Referring back to FIG. 2, in an embodiment, the monitoring of the UICC-specific session ID as described with reference to FIGS. 4 and 5 is implemented by a notification application 230 of the NFC service 212. For example, the notification application is module of computer readable code stored in the non-volatile memory 109 and executed by the host processor 104.

Although the above-described technique has been described with reference to initializing a session between the host controller 222 and the UICC host 224, the technique for initializing a session is also applicable to sessions between the host controller 222 and other secure elements such as the secure memory 108 and the corresponding secure memory host 226. For example, the secure memory 108, the secure memory host 226, and the secure memory-specific session ID 244/246 can be substituted in place of the UICC 240, UICC host 224, and the UICC-specific session ID 240/242. For example, in the process described with reference to FIG. 5, the term "UICC" can be replaced with the term "secure element" or "SE."

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method for controlling operations in a mobile communication device that is enabled for near field communication (NFC), the method comprising:
   starting an NFC service in the mobile communication device;
   starting an initialization process of a secure element (SE) of the mobile communication device in response to starting the NFC service;
   once the initialization process of the SE has begun, monitoring an SE-specific session ID for an indication of the status of the initialization process of the SE;
   if the SE-specific session ID indicates that the initialization process is not complete, continuing to monitor the SE-generated session ID; and
   if the SE-specific session ID indicates that the initialization process is complete, notifying the NFC service that the initialization process of the SE is complete and command the terminal host to release suspended commands/interrupts.

2. The method of claim 1, further comprising:
   suspending at least one operation of the NFC service until the notification is received.

3. The method of claim 1, further comprising:
   suspending the sending of commands/interrupts to the SE until the notification is received.

4. The method of claim 1, further comprising:
   suspending at least one operation of the NFC service while the monitoring of the SE-specific session ID is continued.

5. The method of claim 1, wherein monitoring the SE-specific session ID comprises:
   reading the SE-specific session ID from an NFC controller after the initialization process has begun; and
   comparing the retrieved SE-specific session ID to a default SE-specific session ID.

6. The method of claim 5, wherein the SE-specific session ID indicates that the initialization process is complete when the SE-specific session ID that was read after the initialization process began does not match the default value.

7. The method of claim 6, wherein the default value of the SE-specific session ID is the eight-byte value 0xFF 0xFF 0xFF 0xFF 0xFF 0xFF 0xFF 0xFF.

8. The method of claim 5, wherein the SE-specific session ID is reset to the default value at the NFC controller in response to a command from the SE.

9. The method of claim 1, wherein monitoring the SE-specific session ID comprises:
   reading the SE-specific session ID from an NFC controller before the initialization process of the SE has begun;
   retrieving the SE-specific session ID from the NFC controller after the initialization process has begun; and
   comparing the SE-specific session ID that was read after the initialization process began with the SE-specific session ID that was read before the initialization process began.

10. A mobile communication device that is enabled for near field communication (NFC), the mobile communication device comprising:
    an NFC service including a terminal host;
    an NFC controller including a host controller;
    a secure element (SE) including an SE host; wherein the terminal host, the host controller, and the SE host communicate with each other via a Host Controller Interface (HCI) architecture;
    an application processor configured to monitor an SE-specific session ID for an indication of the status of an initialization process of the SE, if the SE-specific session ID indicates that the initialization process of the SE is not complete, continue to monitor the SE-specific session ID, and if the SE-specific session ID indicates that the initialization process of the SE is complete, notify the terminal host that the initialization process of the SE is complete and command the terminal host to release suspended commands/interrupts.

11. The mobile communication device of claim 10, wherein the terminal host is configured to suspend at least one operation of the NFC service until the notification is received.

12. The mobile communication device of claim 10, wherein the terminal host is configured to suspend sending commands/interrupts to the SE until the notification is received.

13. The mobile communication device of claim 10, wherein the NFC service is configured to suspend at least one operation of the NFC service while the monitoring of the SE-specific session ID is continued.

14. The mobile communication device of claim 10, wherein monitoring the SE-specific session ID comprises reading the SE-specific session ID from the NFC controller.

15. The mobile communication device of claim 10, wherein the NFC controller is a single integrated circuit (IC).

16. The mobile communication device of claim 10, wherein the NFC service makes periodic requests for the SE-specific session ID.

17. The mobile communication device of claim 10, wherein the periodic requests occur at periods of every 100 ms.

* * * * *